US009317261B2

(12) United States Patent
Walter et al.

(10) Patent No.: US 9,317,261 B2
(45) Date of Patent: Apr. 19, 2016

(54) LEVEL BASED DATA SUPPLY FOR REUSABLE INTERFACE COMPONENTS

(75) Inventors: Wolfgang Walter, Heidelberg (DE); Harald Buerner, Mannheim (DE)

(73) Assignee: SAP SE, Walldorf (DE)

( * ) Notice: Subject to any disclaimer, the term of this patent is extended or adjusted under 35 U.S.C. 154(b) by 1779 days.

(21) Appl. No.: 12/632,662

(22) Filed: Dec. 7, 2009

(65) Prior Publication Data

US 2011/0138337 A1 Jun. 9, 2011

(51) Int. Cl.
*G06F 3/00* (2006.01)
*G06F 9/44* (2006.01)

(52) U.S. Cl.
CPC ... *G06F 8/38* (2013.01); *G06F 8/36* (2013.01)

(58) Field of Classification Search
None
See application file for complete search history.

(56) References Cited

U.S. PATENT DOCUMENTS

| 2003/0058286 A1* | 3/2003 | Dando | 345/853 |
| 2004/0225967 A1* | 11/2004 | Hassanin et al. | 715/760 |
| 2009/0132285 A1* | 5/2009 | Jakobovits | 705/3 |
| 2010/0199223 A1* | 8/2010 | Colner | 715/853 |

* cited by examiner

*Primary Examiner* — Anil N Kumar
(74) *Attorney, Agent, or Firm* — Dilworth IP, LLC

(57) ABSTRACT

A system and method for handling reusable graphical components in a dynamic environment. A configuration is buffered in a computer system. An object corresponding to a graphical component is instantiated and assigned a level within the graphical hierarchy. The object is configured based on its location in the hierarchy from the buffered configuration. The object reads its parent identifier from a level buffer based solely on its assigned level and writes its object identifier into the level buffer in association with its assigned level.

13 Claims, 3 Drawing Sheets

LEVEL BASED DATA SUPPLY FOR REUSABLE INTERFACE COMPONENTS

BACKGROUND OF THE INVENTION

1. Field

Embodiments of the invention relate management and use of graphical user interface components. More specifically, embodiments of the invention relate reuse of user interface components in dynamic hierarchical applications.

2. Background

Historically, where hierarchical user interface components have been employed, children components have required knowledge of the parent key information of the parent object. This is required knowledge of the parent and placement within the hierarchy at design time. Such an approach requires significant work to integrate or reuse components in an increasingly dynamic environment.

SUMMARY

A system and method for handling reusable graphical components in a dynamic environment is disclosed. A configuration is buffered in a computer system. An object corresponding to a graphical component is instantiated and assigned a level within the graphical hierarchy. The object is configured based on its location in the hierarchy from the buffered configuration. The object reads its parent identifier from a level buffer based solely on its assigned level and writes its object identifier into the level buffer in association with its assigned level.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1A:
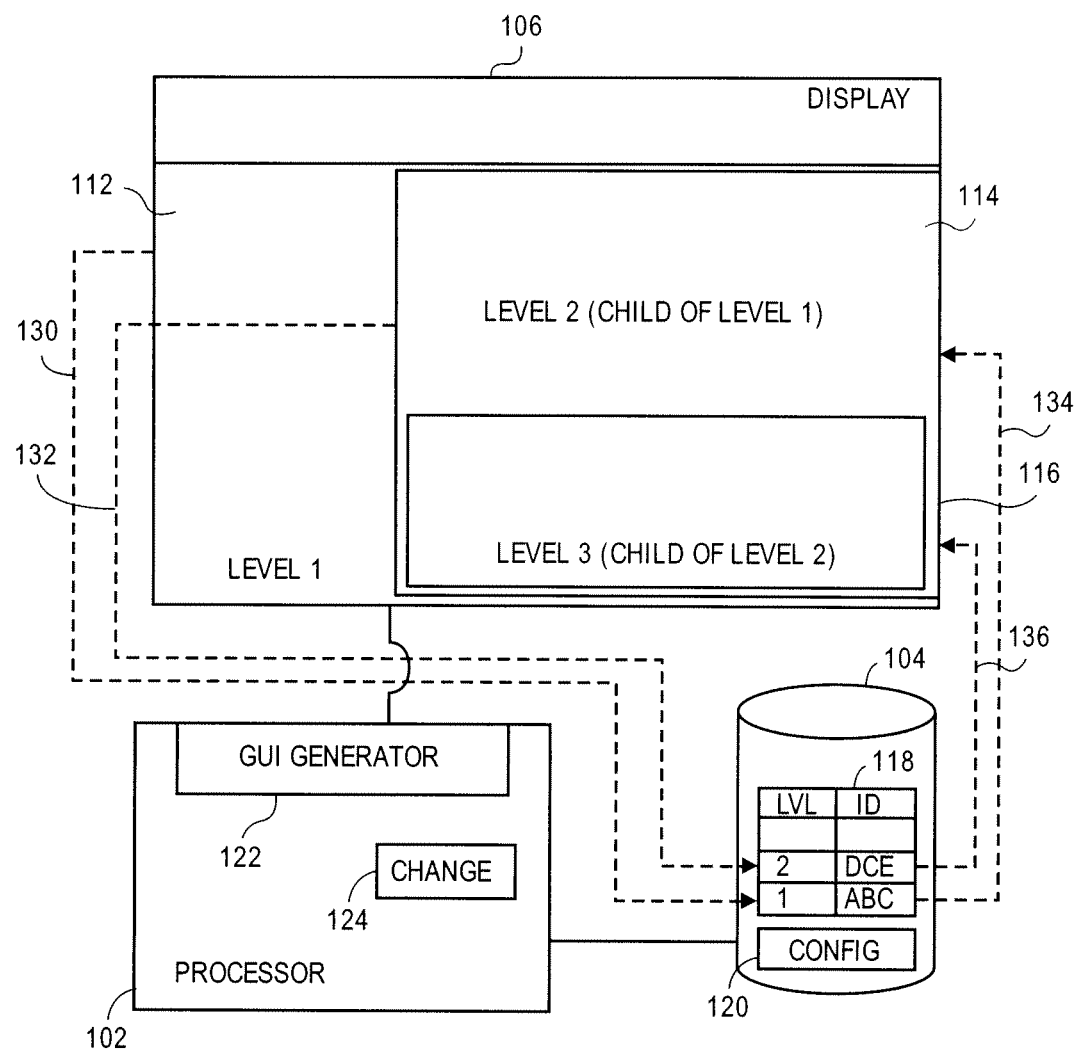
FIG. 1A is a schematic block diagram of a system of one embodiment of the invention.

FIG. 1A is a schematic block diagram of a system of one embodiment of the invention. Processor 102 is coupled to a storage unit 104 and display 106. Storage unit 104 retains a configuration file 120 and a level buffer 118. As explained in greater detail below, the level buffer is an indication of a hierarchical level in association with an object ID corresponding to an object associated with a window to be rendered on display 106. As used herein, a reusable graphical component alternatively referred to as a user interface building block (UIBB) includes an object, a configuration and a window.

Initially, a root object is selected and instantiated. Root object is assigned level one and an associated window is rendered to display 106 by graphical user interface generator 122 executing on processor 102. The level one window 112 can be seen on display 106. Once rendered, the root object writes 130 its identification to level buffer 118 by default in association with level one, here (ABC).

An object that is a child of the root object and, therefore, corresponds to level two is instantiated. An associated window 114 nested within window 112 is rendered by graphical user interface generator 122. The object corresponding to level two knows only its level (level two), but not its parent. The object reads 134 its parent identification from level buffer based on its level (by selecting the next level down) and uses the parent ID into configuration file 120 to configure window 114.

Once configured, the level two object writes 132 its object ID to level buffer 118 in association with level two. Display window 116 is associated with a child object of level two (a level three object) and is nested within window 114. The level three object reads a level two ID from level buffer 118 based on its level, and uses its level and its parent ID to configure the window. The level three object then writes its ID to level buffer 118. This process may be repeated an arbitrary number of times.

Because the level of a component is defined at runtime and configured based on its position in the hierarchy at that point, a component can be reused at different levels and assume a variety of different configurations. This provides great flexibility in reuse of user interface components. In some embodiments, a static level assignment can be passed to a component via the configuration. In such an embodiment, if a static level assignment is passed, it overrules the dynamic level determination for that component.

Figure 1B:
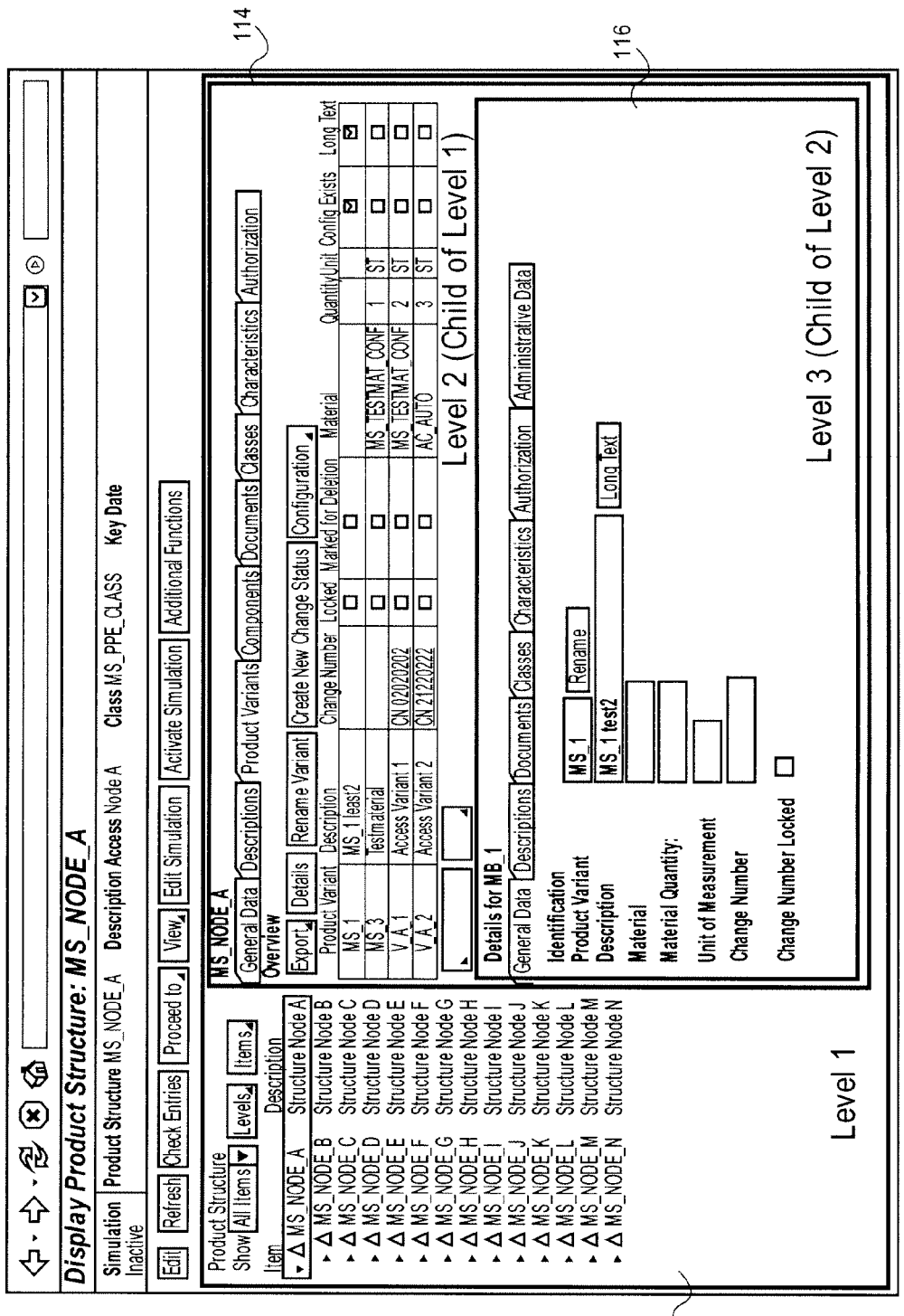
FIG. 1B is a more detailed screen shot of an example display in one embodiment of the invention.

A change module 124 executing on the processor watches the level buffer. If a change in one of the object IDs occurs, the change module invalidates all object IDs at a higher level. For example, if the object identifier for level one were changed, e.g., to AB'C, all other object IDs in the level buffer would be invalidated. If, e.g., the level two object identifier changed to, e.g., DC'E, level one would not be invalidated but all other levels would. FIG. 1B provides a more detailed screen shot of an example displayed in one embodiment of the invention. Windows for level one 112, level two 114 and level three 116 are configured successively at runtime based on their position within the hierarchy.

Figure 2:
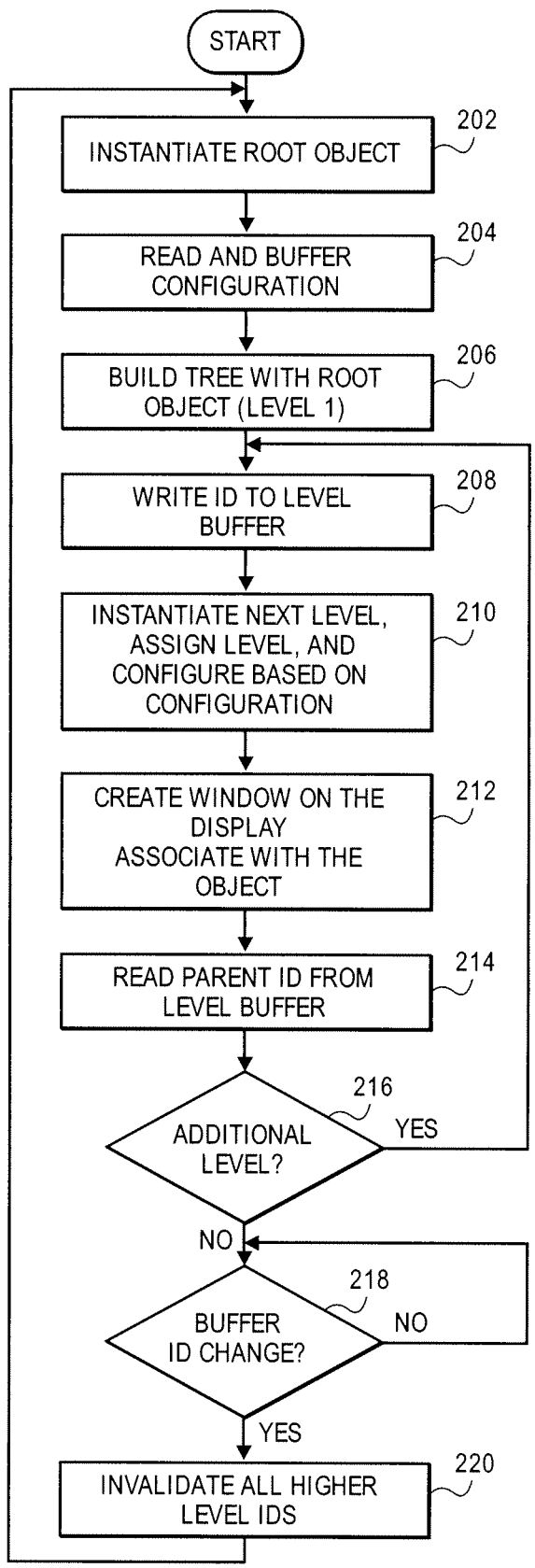
FIG. 2 is a flow diagram of operation in one embodiment of the invention.

FIG. 2 is a flow diagram of operation in one embodiment of the invention. At block 202 a root object is instantiated and assigned a root level. A configuration is read and buffered at block 204. At block 206, a tree is built with the root object in the configuration as level one. At block 208, the identifier for the object is written to the level buffer. On the first pass through, a level defaults to level one for the root object. At block 210, a child object of the predecessor level is instantiated and assigned the current level and configured based on the configuration file buffered in block 204. At block 212, a window is created on the display in association with the object. At block 214, the object reads the parent ID from the level buffer.

A determination is made at decision block 216 if additional levels exist to instantiate. If so, the current level object writes its ID to level buffer at 208 and the process continues. If no additional levels are to be instantiated and a decision is made at decision block 218 whether a change has occurred in the level buffer. If a change has occurred, all IDs at a higher level are invalidated at block 220. The process may then begin again.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   buffering a configuration in a computer;
   instantiating an object corresponding to a graphical component having a hierarchical level assigned at instantiation;
   configuring the instantiated object based on the buffered configuration;
   reading a parent identifier for a parent from a level buffer based on the hierarchical level assigned without knowledge of the parent; and
   writing an object identifier for the object in the level buffer in association with the hierarchical level assigned.

2. The method of claim 1 further comprising:
   associating a window on a display with the instantiated object.

3. The method of claim 1 further comprising:
   invalidating identifiers in the level buffer at all levels higher than a changed entry.

4. The method of claim 1 further comprising:
   accepting, in the computer, a selection of a root object;
   reading a configuration for the root object from a configuration file;
   instantiating the root object; and
   inserting a root identifier in a lowest level of the level buffer.

5. The method of claim 1 where in configuring comprises:
   retrieving data to configure the object based on the parent identifier.

6. A system comprising:
   an electronic display;
   a graphical user interface generator to manipulate the display;
   a plurality of reusable graphical components, each component having an associated window to be displayed on the electronic display; and
   a configuration file to dynamically define a configuration for each of the graphical components based on a position of the respective component within a hierarchy.

7. The system of claim 6 further comprising:
   a level buffer from which each reusable graphical component having a level greater than one reads a parent identifier and writes its own identifier without knowledge of the parent.

8. The system of claim 7 further comprising:
   a change module that invalidates all entries in the level buffer above a changed level.

9. A non-transitory computer readable medium containing instructions that when executed by a processor cause the processor to:
   buffer a configuration in a computer;
   instantiate an object corresponding to a graphical component having a hierarchical level assigned at instantiation;
   configure the instantiated object based on the buffered configuration;
   read a parent identifier for a parent from a level buffer based on the hierarchical level assigned without knowledge of the parent; and
   write an object identifier for the object in the level buffer in association with the hierarchical level assigned.

10. The computer readable medium of claim 9 further containing instructions causing the processor to:
    associate a window on a display with the instantiated object.

11. The computer readable medium of claim 9 further containing instructions causing the processor to:
    invalidate identifiers in the level buffer at all levels higher than a changed entry.

12. The computer readable medium of claim 9 further containing instructions causing the processor to:
    accept, in the computer, a selection of a root object;
    read a configuration for the root object from a configuration file;
    instantiate the root object; and
    insert a root identifier in a lowest level of the level buffer.

13. The computer readable medium of claim 9 wherein the instruction causing the processor to configure comprise instructions causing the processor to:
    retrieve data to configure the object based on the parent identifier.

* * * * *